(12) United States Patent
Stancik et al.

(10) Patent No.: US 10,075,418 B1
(45) Date of Patent: Sep. 11, 2018

(54) MODULAR ENCRYPTION DEVICE

(71) Applicant: Amazon Technologies, Inc., Seattle, WA (US)

(72) Inventors: Paul A. Stancik, Seattle, WA (US); Frederick David Sinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/469,328

(22) Filed: Mar. 24, 2017

(51) Int. Cl.
*H04L 29/06* (2006.01)

(52) U.S. Cl.
CPC ........ *H04L 63/0428* (2013.01); *H04L 63/061* (2013.01)

(58) Field of Classification Search
CPC .. H04L 63/0428; H04L 29/06; H04L 63/0823
See application file for complete search history.

(56) References Cited

U.S. PATENT DOCUMENTS

| | | | | |
|---|---|---|---|---|
| 5,016,277 A | * | 5/1991 | Hamilton | .............. G07F 7/1016 380/277 |
| 8,500,465 B1 | | 8/2013 | Ross et al. | |
| 9,571,414 B2 | | 2/2017 | Word et al. | |
| 2004/0111739 A1 | * | 6/2004 | Winegard | .............. H04N 7/148 725/31 |
| 2005/0135814 A1 | * | 6/2005 | Courtney | ............... H04B 10/07 398/147 |
| 2008/0005589 A1 | * | 1/2008 | Tsukazaki | .............. G06F 21/78 713/193 |
| 2010/0095110 A1 | * | 4/2010 | Noble | ................... H04L 9/0891 713/153 |
| 2014/0108782 A1 | * | 4/2014 | Salinger | ................. G06F 21/10 713/155 |

* cited by examiner

*Primary Examiner* — Ali Abyaneh
(74) *Attorney, Agent, or Firm* — Robert C. Kowert; Meyertons, Hood, Kivlin, Kowert & Goetzel, P.C.

(57) ABSTRACT

A modular encryption device includes a chassis configured to mount in a rack with a networking device and sets of ports mounted on the chassis. Encryption cards are mounted in the chassis of the modular encryption device between ports of the sets of ports such that network traffic flowing through a set of ports flows through one of the encryption cards. The encryption cards of the modular encryption device are configured to encrypt and decrypt network traffic flowing between the networking device and a remote device. In some embodiments, a modular encryption device may encrypt and decrypt network traffic flowing between multiple networking devices and multiple remote devices. Also, in some embodiments, components of a modular encryption device are removable and replaceable such that the modular encryption device can be reconfigured by exchanging the components.

18 Claims, 12 Drawing Sheets

MODULAR ENCRYPTION DEVICE

BACKGROUND

A service provider of computing, storage, and/or network services may operate one or more facilities, such as data centers, that include multiple networking devices. Some networking devices included in the facilities may include built-in encryption capabilities, while other networking devices may not include such encryption capabilities.

Customers of a service provider that operates computing facilities that include at least some networking devices without built-in encryption capabilities may request that the service provider offer services to the customers that include encrypted communications. In order to provide such services, the service provider may be required to replace networking devices without built-in encryption capabilities with new networking devices that include built-in encryption capabilities. Some provider networks may include multiple networking devices located in multiple facilities so that upgrading the service provider's networking devices with new networking devices may prove costly, labor intensive, and may impact the provider network's ability to process customer network traffic while performing the upgrade.

Also, as encryption and networking technology evolve, encryption hardware built into networking devices may become outdated and/or obsolete. In order to upgrade to newer encryption hardware, networking devices with built-in encryption capabilities may be required to be replaced with new networking devices. Such upgrades may also be costly, labor intensive, and disruptive of operations of a provider network.

Figure 1A:
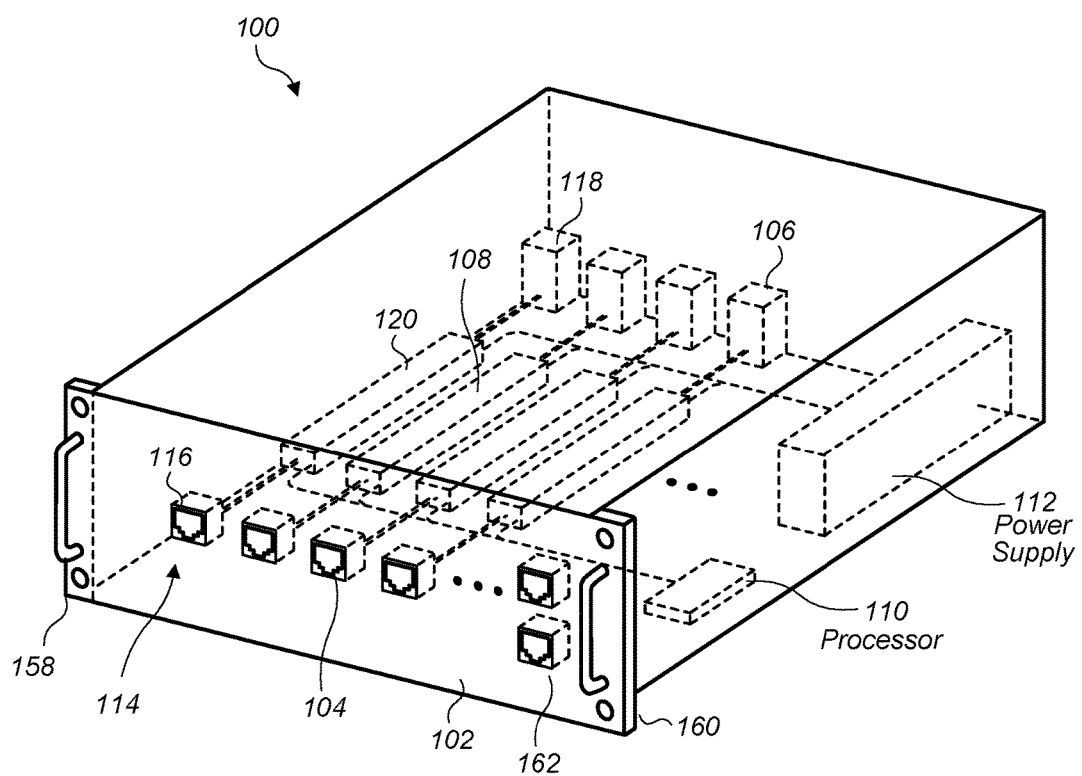
FIG. 1A is perspective view of a modular encryption device, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing modular encryption devices are disclosed. According to one embodiment, a system includes a networking device mounted in a rack and a modular encryption device mounted in the rack. The modular encryption device includes a chassis configured to couple with the rack and sets of communication ports, wherein each set comprises a first port and a second port, wherein the first ports are connected to the networking device and the second ports are connected to one or more remote devices. The modular encryption device also includes slots located between the first and second ports and modular encryption cards mounted in the slots such that network traffic passing between a first port and a second port of a respective one of the sets of communication ports flows through a respective one of the modular encryption cards mounted in a respective slot corresponding to the respective one of the sets of communication ports. The modular encryption cards are configured to encrypt and decrypt network traffic as network traffic flows through the modular encryption cards. For example, a modular encryption device may be included in a rack with a networking device that does not include built-in encryption capabilities to encrypt and decrypt network traffic flowing to and from the networking device without built-in encryption capabilities. In some embodiments, modular encryption devices may be included at either end of a link and may encrypt and decrypt network traffic over the link. Also, in some embodiments, modular encryption devices may exchange encrypted network traffic over a link and exchange encryption coordination information, such as encryption keys, over a separate out-of-band network link. In other embodiments, a modular encryption device may exchange encryption coordination information in-band over a same link through which encrypted network traffic is exchanged with a remote device.

According to one embodiment, a modular encryption device includes a chassis, sets of communication ports coupled with the chassis, wherein each set comprises a first port and a second port, slots located between the first and second ports, and a modular encryption card mounted in one of the slots such that network traffic passing between a first port and a second port associated with the slot flows through the modular encryption card. The modular encryption card is configured to encrypt and decrypt network traffic as the network traffic flows through the modular encryption card.

According to one embodiment, a method includes receiving, by a modular encryption device mounted in a rack, network traffic from a networking device mounted in the rack, wherein the modular encryption device comprises a chassis separate from a chassis of the networking device. The method further includes encrypting, via a modular encryption card of the modular encryption device, the received network traffic and forwarding the encrypted network traffic to a remote device connected to the modular encryption device. In some embodiments, the method also includes receiving, by the modular encryption device, encrypted network traffic, decrypting, via the modular encryption card, the received encrypted network traffic, and forwarding the decrypted network traffic to the network device mounted in the rack with the modular encryption device.

A modular encryption device may allow for encrypted communication to be provided over links with networking devices that do not include built-in encryption capabilities. For example, a modular encryption device may be coupled in a communication path between a networking device that does not include built-in encryption capability and a remote device. The modular encryption device may receive unencrypted network traffic from the networking device without built-in encryption capability and encrypt the network traffic before forwarding the network traffic on to the remote device. Also, a modular encryption device may receive encrypted network traffic from a remote device, decrypt the encrypted network traffic, and forward the unencrypted network traffic on to a networking device that does not include built-in encryption capabilities. In some embodiments, a modular encryption device may be configured to mount in a standard rack slot, for example a 1U slot, of a standard rack. A standard rack may conform to an Electronic Industries Alliance (EIA) standard for rack dimensions.

In addition, in some embodiments, components of a modular encryption device may also be modular components and the modular encryption device may be configured for the modular components to be removed and replaced with other modular components based on customer needs and a current desired configuration. For example, a modular encryption card of a modular networking device may couple into a slot of the modular encryption device. In the event that a configuration change is needed, the modular encryption card may be removed from the modular encryption device and replaced with another modular encryption card. Thus, as new encryption technologies are developed modular encryption cards of a modular encryption device may be exchanged for newer cards without replacing the modular encryption device. In a similar manner a CPU of a modular encryption device may be exchanged for another CPUs. In some embodiments, a modular encryption device may be further configured to accept modular optical elements configured to send and receive optical signals, such as optical signals over fiber optic cables.

In some embodiments, a modular encryption device may be configured to exchange encryption coordination information with a remote device over an out-of-band connection. For example, the modular encryption device may include sets of ports, wherein at least one port of each set is connected to one or more remote devices and may also include an additional connection via an out-of-band port that is separate from the sets of ports connected to the one or more remote devices. In some embodiments, a modular encryption device may exchange encryption coordination information for multiple encrypted links involving multiple sets of ports via a common out-of-band port. The modular encryption device may include a processor that coordinates an exchange of the encryption coordination information, for example encryption keys, with the one or more remote devices. The processor may also be configured to provide at least some of the encryption coordination information, such as encryption keys, to separate modular encryption cards associated with separate sets of ports. The modular encryption cards may use the provided encryption coordination information to encrypt and decrypt network traffic flowing between a set of ports via the modular encryption card.

In some embodiments, a modular encryption device may not establish an out-of-band connection with a remote device to exchange encryption coordination information. For example, the remote device may not be configured to support an encrypted connection and an additional out-of-band connection. In embodiments in which a modular encryption device does not establish an out-of-band connection with a remote device to exchange encryption coordination information, a processor of the modular encryption device may be configured to exchange encryption coordination information with the remote device via an in-band-connection. For example, the processor may be configured to insert and extract encryption coordination information along with encrypted network traffic that is being forwarded and received via a set of ports and an associated modular encryption card.

In some embodiments, a modular encryption card may be a media access control secure (MASEC) physical layer transceiver (PHY). In some embodiments, a modular encryption card may be a field programmable gate array (FPGA) configured to encrypt data according to an industry encryption standard. Also, in some embodiments, a non-standard encryption format may be used. For example, a non-industry standard proprietary encryption format may be used between modular encryption devices included in a common provider network. In some embodiments, a modular encryption card may be another type of card that includes hardware embedded or software enabled encryption capabilities.

FIG. 1A is perspective view of a modular encryption device, according to some embodiments. Modular encryption device 100 includes chassis 102, ports 104 on a front side of chassis 102 and ports 106 on a backside of chassis 102. Modular encryption device 100 also includes modular encryption cards 108, processor 110, and power supply 112. In some embodiments, ports of a modular encryption device may be organized in sets wherein each set includes a first port and a second port both connected to a modular encryption card. For example, set 114 includes first port 116 and second port 118. Modular encryption card 120 is coupled to both first port 116 and second port 118. In some embodiments, either first port 116 or second port 118 may be coupled to a local networking device, such as a networking device mounted in the same rack with modular encryption device 100 and the other one of first port 116 or second port 118 may be coupled to a remote device, such as a networking device in another data center or another modular encryption device in another data center. In some embodiments, one or more intermediary devices may be included in a connection between a modular encryption device and a remote device, such as intermediary networking devices. While in FIG. 1A ports 116 and ports 118 of set 114 are illustrated on opposite sides of chassis 102, in some embodiments a first port and a second port of a set of ports, such as set 114, may be on the same side of a chassis of a modular encryption device, or may be arranged on a chassis of a modular encryption device in various other configurations.

In some embodiments, a chassis of a modular encryption device, such as chassis 102, may be configured to mount in a slot of a standard rack, such as a 1U slot of a standard rack. For example, mounting plates 158 and 160 may be configured to couple with bolt holes in rails of a standard 1U rack slot. In some embodiments, a modular encryption device may have a height greater than 1U.

In some embodiments, a modular encryption device also includes out-of-band port(s) and a processor configured to exchange encryption coordination information via the out-of-band port(s). For example, modular encryption device 100 includes out-of-band ports 162 coupled to processor 110.

In some embodiments, a processor of a modular encryption device, such as processor 110, may provide encryption information to respective ones of the modular encryption cards included in the modular encryption device. For example, processor 110 may exchange encryption coordination information with a remote device via out-of-band ports 122 and then may provide at least some of the exchanged encryption coordination information with modular encryption cards 108. For example, processor 110 may provide modular encryption cards 108 with encryption key information and may update modular encryption cards 108 with updated encryption keys as the updated encryption keys are received from a remote device connected with processor 110 via out-of-band ports 162.

In some embodiments, a processor, such as processor 110, may exchange encryption coordination information with one or more remote devices that includes encryption information for multiple ones of the modular encryption cards of a modular encryption device. For example, processor 110 may exchange encryption coordination information for all or a portion of the modular encryption cards 108 included in modular encryption device 100 via out-of-band port(s) 162.

In some embodiments, a modular encryption device, such as modular encryption device 100, may further include a power supply, such as power supply 112. A power supply, such as power supply 112, may provide electrical power to modular encryption cards and a processor of a modular encryption device. For example, power supply 112 may provide power to modular encryption cards 108 and processor 110. In some embodiments, a modular encryption device may include one or more air moving devices, such as fans, and a power supply, such as power supply 112, may provide electrical power to the air moving devices.

Figure 1B:
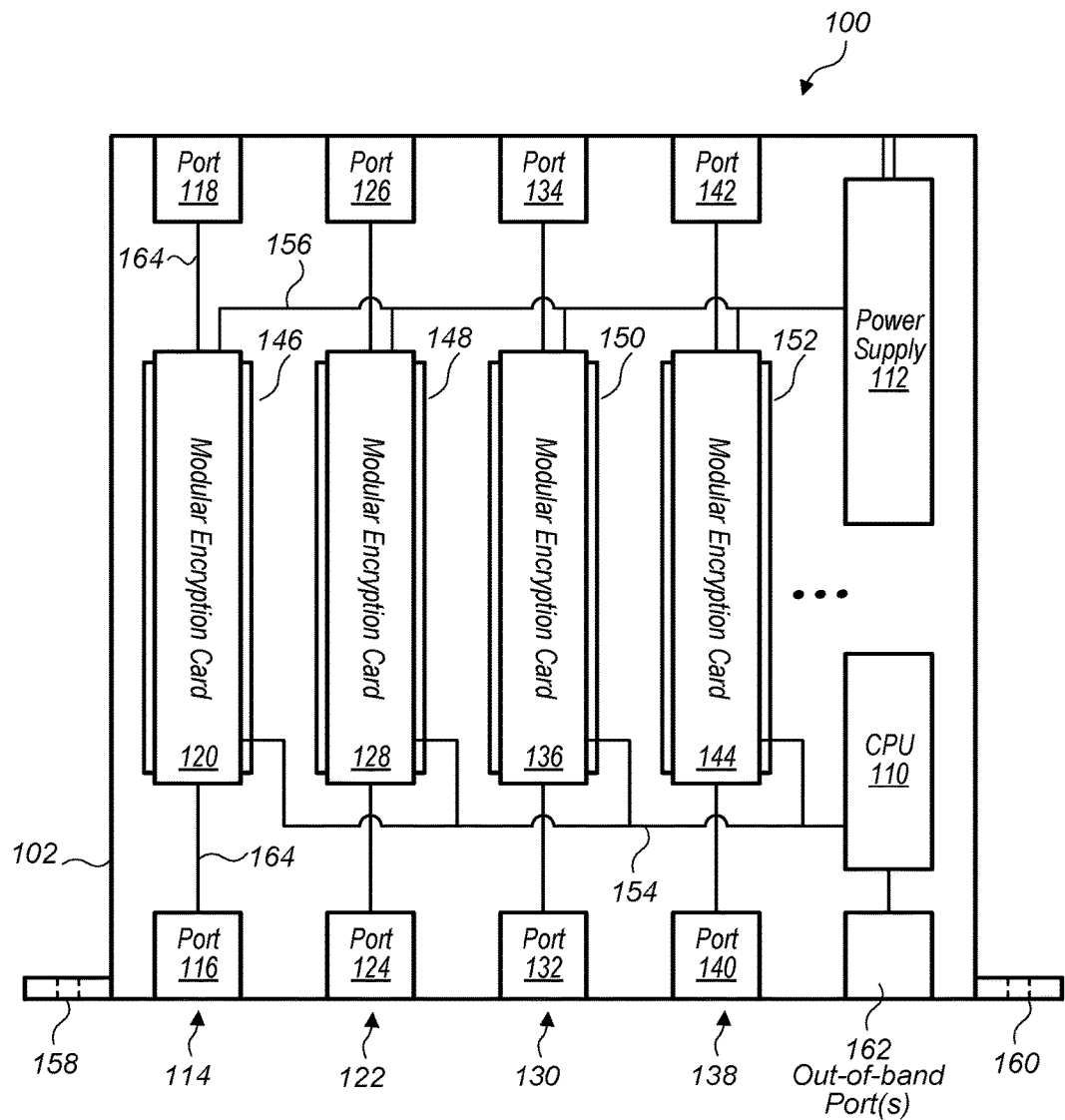
FIG. 1B is a block diagram illustrating components of a modular encryption device from a top view, according to some embodiments.

FIG. 1B is a block diagram illustrating components of a modular encryption device from a top view, according to some embodiments. Modular encryption device 100 illustrated in FIG. 1B may be the same modular encryption device 100 illustrated in FIG. 1A. Modular encryption device 100 includes sets 114, 122, 130, and 138 of ports and associated slots with modular encryption cards mounted in the slots. For example, set 114 includes first port 116, second port 118, and modular encryption card 120 mounted in slot 146 between first port 116 and second port 118. Set 122 includes first port 124, second port 162 and modular encryption card 128 mounted in slot 148 between first port 124 and second port 126. Set 130 includes first port 132, second port 134, and modular encryption card 136 mounted in slot 150 between first port 132 and second port 134. Set 138 includes first port 140, second port 142, and modular encryption card 144 mounted in slot 152 between first port 140 and second port 142. A first port, a modular encryption card, and a second port of a set, such as first port 116, modular encryption card 120, and second port 118 of set 114, may be connected via respective connection, such as traces, ribbon cables, or other suitable means to transmit data between the respective components of the set. For example, connections 164 couple ports 116 and 118 to modular encryption card 120.

A processor of a modular encryption device, such as processor 110, may be connected to modular encryption cards, such as modular encryption cards 120, 128, 136, and 144, via traces, such as traces 154. Also, a power supply of a modular encryption device, such as power supply 112, may provide electrical power to modular encryption cards, such as modular encryption cards 120, 128, 136, and 144, via traces, such as traces 156. In some embodiments, other connection means such as cables may be used to provide power to modular encryption cards or to connect a processor to the modular encryption cards.

One or more sets of ports of a modular encryption device, such as modular encryption device 100, may be connected via one of the ports of the set to a networking device local to the modular encryption device and may be connected via another one of the ports of the set to a remote device, such as another modular encryption device in another data center or another network device in a remote location. In some embodiments, one of the set of ports may be connected via a network to a client device such as a personal computer. For simplicity of explanation one of the ports of the set is referred to herein as a "first port" and another one of the ports of the set is referred to as a "second port." However, order should not be inferred based on the use of the terms "first" and "second." In some embodiments, the order may be reversed. For example in some embodiments a first port may be connected to a local networking device and in other embodiments the second port may be connected to a local networking device.

In operation, networking traffic may be received by a modular encryption device from a local networking device via one of the ports of a set of ports. For example, network traffic from a local networking device may be received via port 116 of set 114. The networking traffic may be received in an unencrypted format and may flow into a modular encryption card, such as modular encryption card 120. The modular encryption card may use one or more previously exchanged encryption keys to encrypt the network traffic. For example, a modular encryption card may be a MASEC PHY and may encrypt the received network traffic in accordance with a MASEC standard. Also, a modular encryption device may be an FPGA configured to encrypt traffic according to an encryption standard. The encrypted network traffic may then flow to a remote device via another port of the set, such as port 118 of set 114. In a similar manner, encrypted network traffic may be received from a remote device by a modular encryption card via a port of a set, such as port 118 of set 114. The modular encryption card may apply one or more previously exchanged encryption keys to decrypt the received encrypted network traffic. The decrypted network traffic may then flow from the modular encryption card to a local network device via another one of the ports of the set, for example port 116 of set 114.

In some embodiments, a processor of a modular encryption device may coordinate an exchange of encryption coordination information. For example, processor 110 may establish a connection with a remote device via one of out-of-band ports 162. The processor may execute a handshake operation with the remote device and exchange encryption key information with the remote device. The processor may then provide encryption key information to one of the modular encryption cards. In some embodiments, a processor, such as processor 110, may initialize an out-of-band connection with a remote device and exchange encryption key updates with a remote device via the out-of-band connection. In some embodiments, a processor, such as processor 110, may manage encryption key information for multiple ones of the modular encryption cards of a modular encryption device. For example, processor 110 may coordinate exchanges of encryption coordination information, such as encryption keys, for modular encryption cards 120, 128, 136, and 144. Processor 110 may provide current encryption key information to encryption cards 120, 128, 136, and 144 via traces 154.

In some embodiments, a modular encryption card and/or a processor of a modular encryption device may exchange encryption coordination information with a remote device via an in-band connection. For example, in some situations a remote device may not be configured to exchange encryption coordination information via an out-of-band connection. In order to exchange encryption coordination information in-band, a modular encryption card may insert encryption coordination information into a traffic flow that includes traffic received from a local networking device that has been encrypted by the modular encryption card. In some embodiments, a processor of a modular encryption device may generate the encryption coordination information and provide the encryption coordination information to the modular encryption card to insert in the network traffic flow. Also, in some embodiments, a modular encryption card may extract encryption coordination information from network traffic received from a remote device. For example encryption coordination information may be included along with encrypted data in in a network traffic flow from a remote device and the modular encryption card may extract the encryption coordination information from the network traffic flow that includes encrypted data from the remote device, though the encryption coordination information itself may not be encrypted. The extracted encryption coordination information may be provided to a processor of the modular encryption device, such as processor 110, to be processed and stored. The processor, may then provide encryption information, such as encryption keys, to the modular encryption card to use in encrypting and decrypting network traffic. In some embodiments, processing and storing of encryption coordination information may be performed by a modular encryption card without using a processor, such as processor 110.

Figure 2:
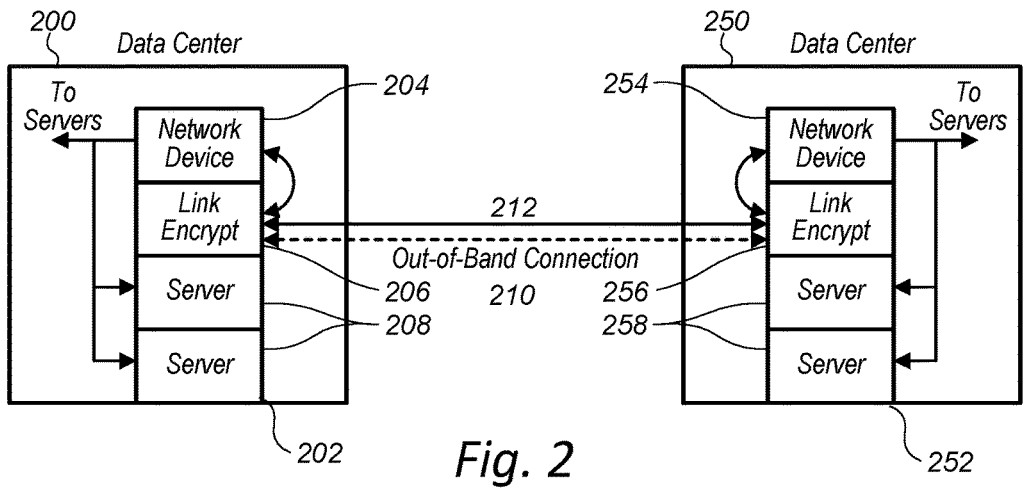
FIG. 2 is a block diagram illustrating data centers that include modular encryption devices that are connected via an encrypted link and an out-of-band connection, according to some embodiments.

FIG. 2 is a block diagram illustrating data centers that include modular encryption devices that are connected via an encrypted link and an out-of-band connection, according to some embodiments. Data center 200 includes rack 202 with networking device 204, modular encryption device 206, and servers 208 mounted in rack 202. Data center 250 includes rack 252 with networking device 254, modular encryption device 256, and servers 258 mounted in rack 252.

Encryption coordination information may be exchanged between modular encryption device 206 and modular encryption device 256 via out-of-band connection 210 via out-of-band ports of the modular encryption devices 206 and 256 and the networking devices 204 and 254. In some embodiments, an out-of-band connection may be established via a same networking device from which a modular encryption device receives network traffic to encrypt or via another route to a remote device. For example, out-of-band connection 310 between modular encryption device 306 and modular encryption device 356 may be established via networking device 304 and/or networking device 354, or may be established via another route between modular encryption device 306 and modular encryption device 356. In some embodiments, a separate management device may manage out-of-band connections for multiple modular encryption devices.

Also, encrypted link 212 may be established between modular encryption devices 206 and 256. Some network traffic in data center 200 may be routed to networking device 204 from servers 208 or from other computing devices, such as other servers, in the data center. The network traffic may flow from networking device 204 to modular encryption device 206 and be encrypted via a modular encryption card of the modular encryption device 206. The encrypted network traffic may be communicated over encrypted link 212 to modular encryption device 256 in data center 250. Modular encryption device 256 may decrypt the encrypted network traffic and forward the decrypted network traffic to networking device 254. Networking device 254 may forward the decrypted network traffic to servers 258 or to other servers in data center 250. A similar process may be followed for network traffic flowing out of data center 250 toward data center 200. For example, modular encryption device 256 may encrypt network traffic and forward the encrypted network traffic to modular encryption device 206 in data center 200 via encrypted link 212. Modular encryption device 206 may decrypt the encrypted network traffic and forward it to networking device 204. The networking device 204 may then forward the decrypted network traffic to servers 208 or to other computing devices, such as servers, in data center 200.

In some embodiments, data center 200 and data center 250 may be part of a provider network operated by a single entity. In some embodiments, one of data centers 200 and 250 may be operated by a provider network and another one of data centers 200 and 250 may be operated by a client of the provider network. In some embodiments, data center 200 and data center 250 may be operated by unrelated entities.

In some embodiments, additional data security may be provided by using multiple layers of encryption. For example, network traffic encrypted by a first modular encryption device may be further encrypted by an additional modular encryption device.

Figure 3:
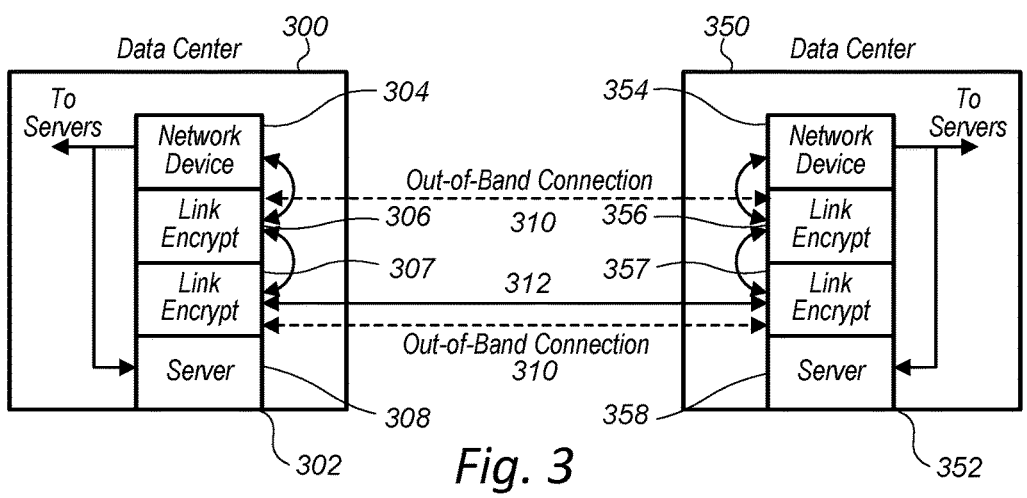
FIG. 3 is a block diagram illustrating data centers that include multiple modular encryption devices that are connected via an encrypted link and an out-of-band connection, according to some embodiments.

FIG. 3 is a block diagram illustrating data centers that include multiple modular encryption devices that are connected via an encrypted link and an out-of-band connection, according to some embodiments. Data center 300 includes rack 302 with networking device 304, modular encryption devices 306 and 307, and server 308 mounted in the rack 302. Data center 350 includes rack 352 with networking device 354, modular encryption devices 356 and 357, and server 358 mounted in rack 352. Encryption coordination information may be exchanged between modular encryption devices 306 and 307 and modular encryption devices 356 and 357 via out-of-band connection(s) 310 in a similar manner as described above. However, network traffic leaving networking device 354 may be encrypted twice before being communicated over encrypted link 312. For example network traffic may flow from networking device 304 to modular encryption device 306 wherein the network traffic may be encrypted. The encrypted network traffic may then flow from modular encryption device 306 to modular encryption device 307, wherein a second layer of encryption may be applied. For example the encrypted network traffic may be encrypted an additional time using a different encryption key than used in modular encryption device 306.

The double encrypted network traffic may then be forwarded to modular encryption device 357 wherein the second layer of encryption may be decrypted. The partially decrypted network traffic may then flow to modular encryption device 356 wherein the partially decrypted network traffic may be fully decrypted, e.g. the first layer of encryption may be decrypted. The decrypted network traffic may then flow to networking device 354 and server 358 or other servers in data center 350.

In some embodiments, each modular encryption device may implement a separate out-of-band connection with a corresponding remote modular encryption device. For example, modular encryption device 306 may implement an out-of-band connection with modular encryption device 356 and modular encryption device 307 may implement a separate out-of-band connection with modular encryption device 357. Also, in some embodiments, multiple modular encryption devices, such as modular encryption devices 306 and 307, may share an out-of-band connection with corresponding remote modular encryption devices, such as modular encryption devices 356 and 357. For example a single out-of-band connection may be used by both modular encryption devices 306 and 307 to exchange encryption coordination information with modular encryption devices 356 and 357.

In some embodiments, an out-of-band connection may not be used to exchange encryption coordination information. For example, a remote device such as a client device or a remote networking device may not be configured to support an out-of-band connection. In such embodiments, encryption coordination information may be inserted and extracted in a network traffic stream than includes encrypted network traffic.

Figure 4:
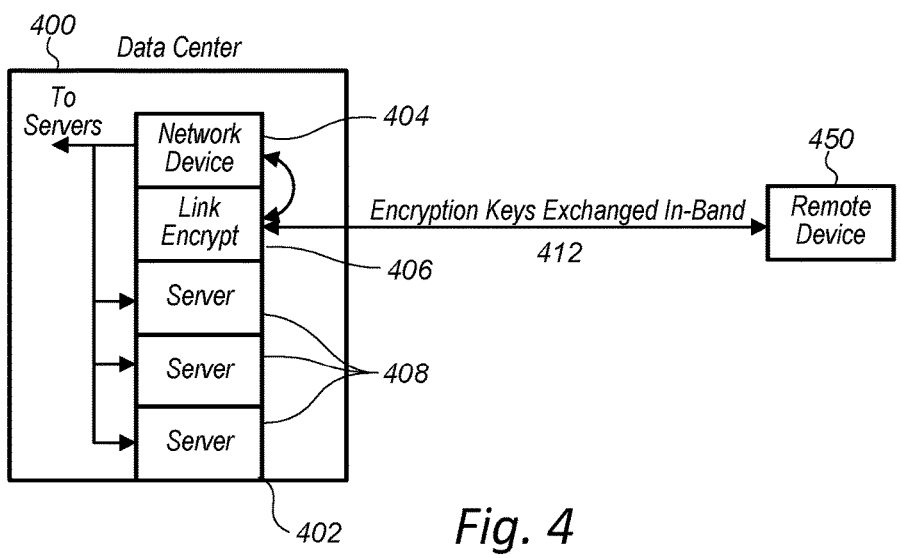
FIG. 4 is a block diagram illustrating a data center that includes a modular encryption device connected via an encrypted link and that exchanges encryption keys in-band, according to some embodiments.

FIG. 4 is a block diagram illustrating a data center that includes a modular encryption device connected via an encrypted link and that exchanges encryption keys in-band, according to some embodiments. Data center 400 includes rack 402 with networking device 404, modular encryption device 406, and servers 408 mounted in rack 402. Modular encryption device 406 is connected to a remote device 450 at a location remote from data center 400. The modular encryption device 406 may exchange encryption coordination information with remote device 450 in order to establish an encrypted connection. For example, modular encryption device 406 and remote device 450 may execute a handshake protocol and exchange encryption keys. The modular encryption device may then use the exchanged encryption keys to encrypt network traffic from networking device 404 before forwarding the network traffic as encrypted network traffic to remote device 450 via encrypted link 412. The remote device 450 may then decrypt the encrypted network traffic and store the information or forward the decrypted network traffic on to one or more other devices. A similar process may take place for network traffic being sent from remote device 450. For example, remote device 450 may encrypt network traffic being sent to modular encryption device 406 via encrypted link 412. Modular encryption device 406 may decrypt the network traffic and forward the decrypted network traffic on to networking device 404 and servers 408. In some embodiments network coordination information such as updated encryption keys may be included in a network traffic stream being communicated via encrypted link 412.

In some embodiments, a modular encryption device may include modular components and the modular encryption device may be configured for the modular components to be removed and replaced.

Figure 5A:
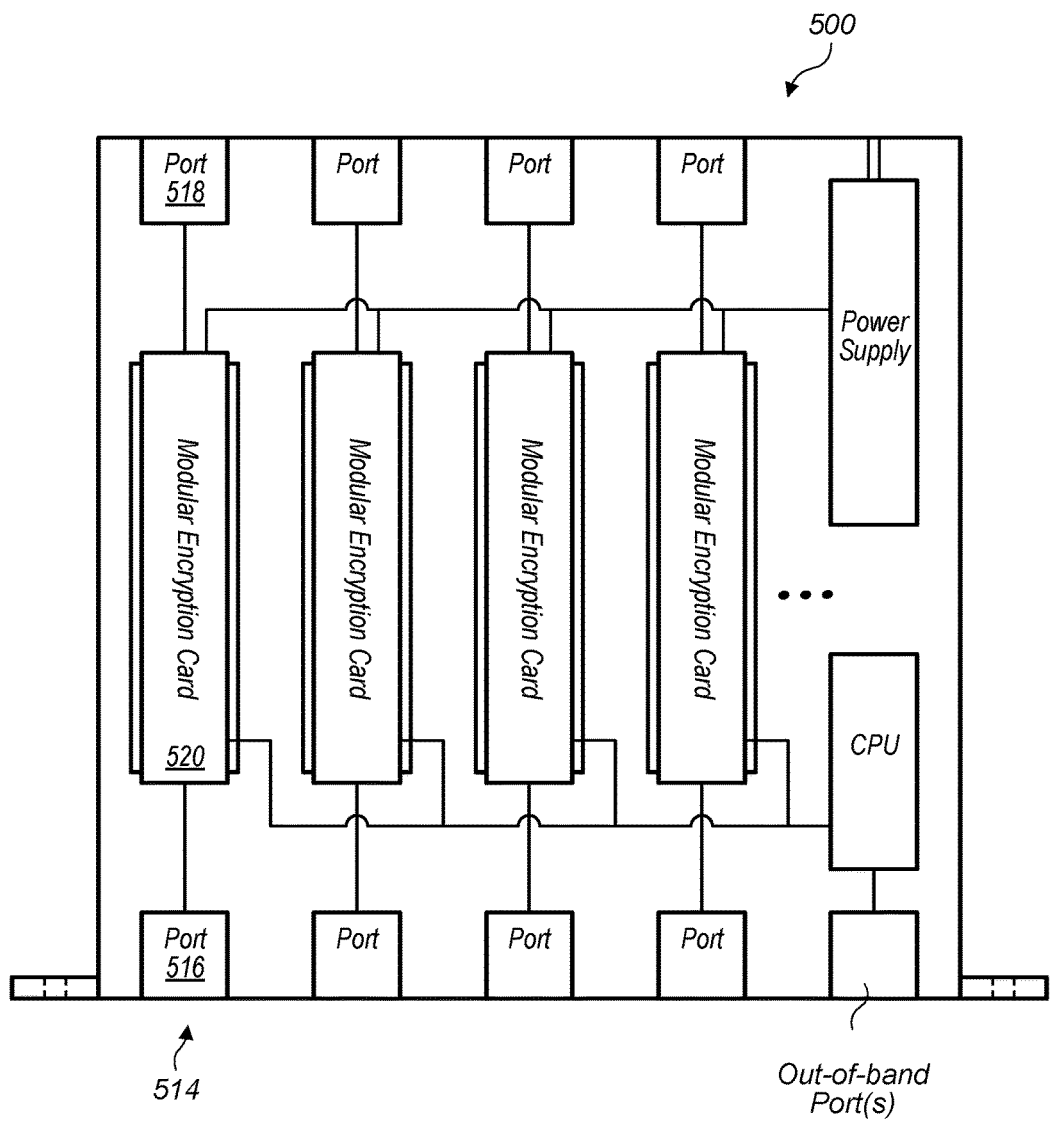
FIGS. 5A-C illustrate a modular encryption card of an encryption device being replaced, according to some embodiments.
Figure 5B:
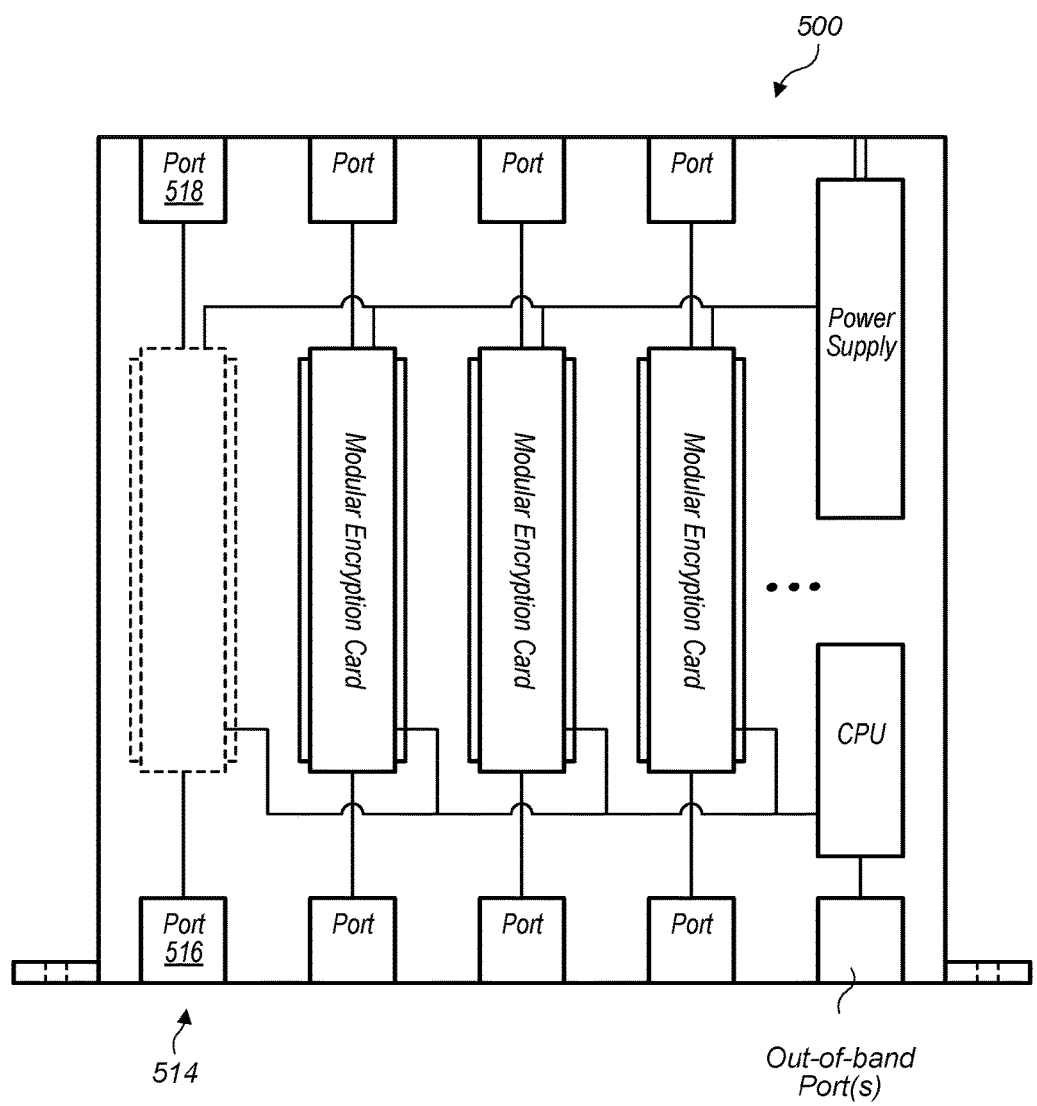
Figure 5C:
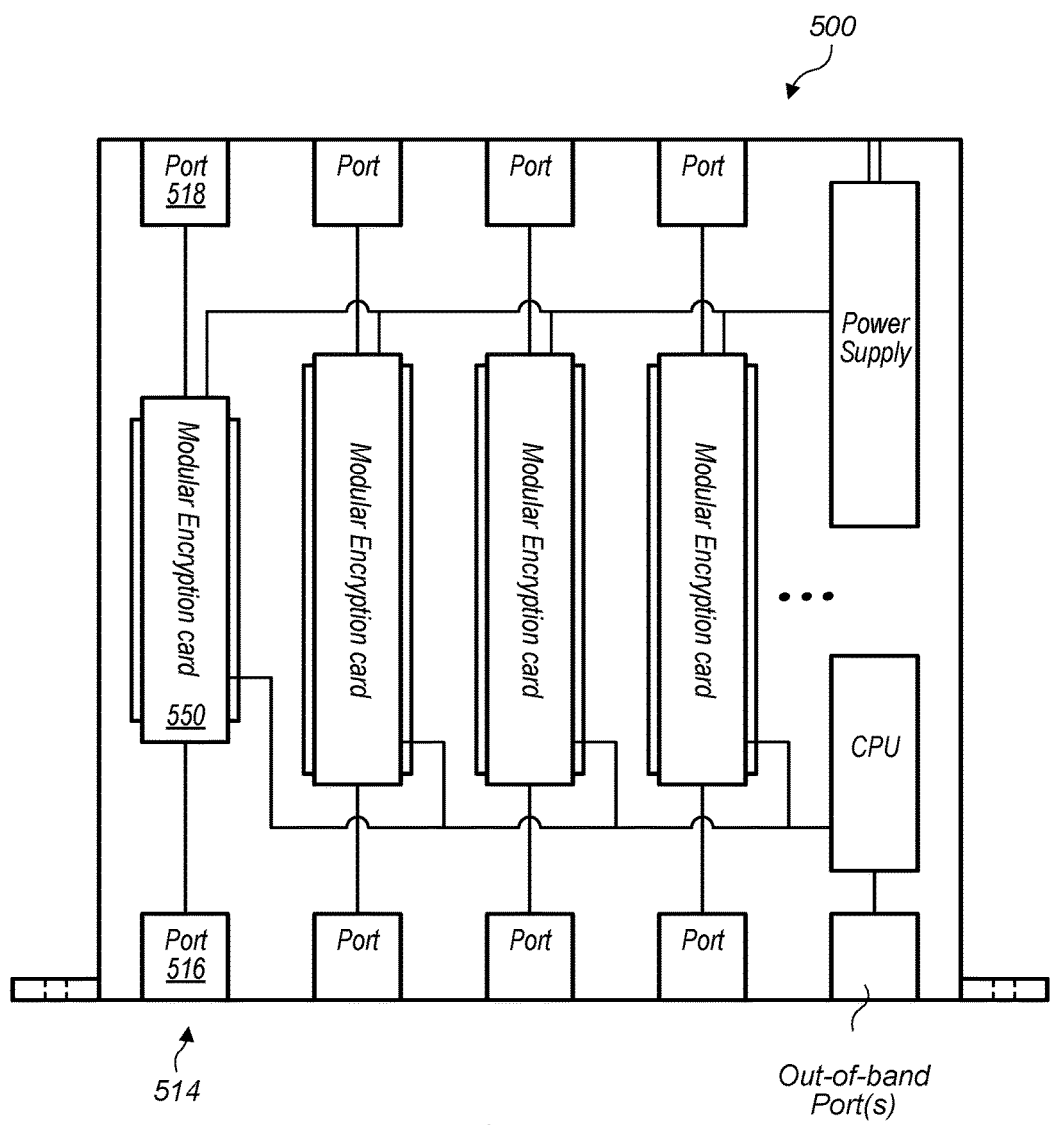

FIGS. 5A-C illustrate a modular encryption card of an encryption device being replaced, according to some embodiments. Modular encryption device 500 may be a similar modular encryption device as modular encryption device 100 described in regard to FIG. 1B or any other modular encryption device described herein. In some situations, it may be determined that encryption is not needed for a link via ports 516 and 518 of set 514. Therefore, as shown in FIG. 5B modular encryption card 520 may be removed. In some embodiments a modular encryption device may be configured to forward network traffic without encrypting the network traffic via a set of ports that does not include an associated modular encryption card. In some embodiments, a different type, size, or capacity modular encryption card may be installed in place of a current modular encryption card of a modular encryption device. For example, FIG. 5C illustrates a smaller modular encryption card 550 being installed in place of modular encryption card 520. In some embodiments, modular encryption cards may be replaced with various types or size of modular encryption cards to meet a desired configuration. Also, in some embodiments, modular encryption cards may be replaced due to the modular encryption cards becoming outdated or due to failure.

In some embodiments, a modular encryption device may further include optical elements configured to convert electrical signals into optical signals that are transmitted over an optical medium such as a fiber optic cable to a remote device.

Figure 6:
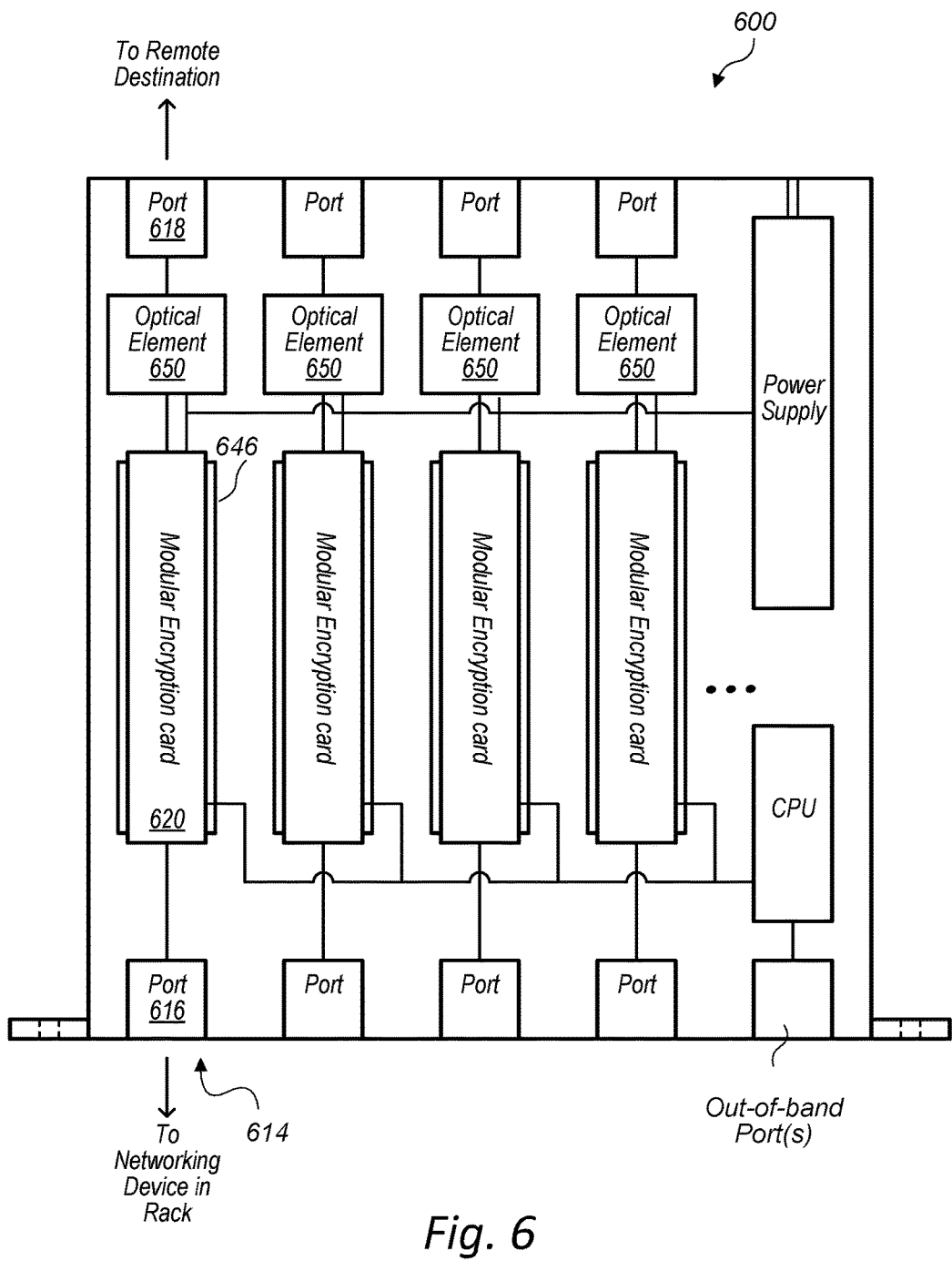
FIG. 6 is a block diagram illustrating components of a modular encryption device that includes optical elements from a top view, according to some embodiments.

FIG. 6 is a block diagram illustrating components of a modular encryption device that includes optical elements from a top view, according to some embodiments. Modular encryption device 600 includes similar components as modular encryption device 100 illustrated in FIG. 1B. However, modular encryption device 600 further includes optical elements, such as optical elements 650. Any of the modular encryption devices described herein may include optical elements such as those described in regard to FIG. 6.

Using set 614 as an example, networking traffic may be received from a local networking device via port 616, the networking traffic may then be encrypted via modular encryption card 620, and the encrypted traffic may then be transmitted from modular encryption device 600 as an optical signal. For example, port 618 may be a fiber optic port and optical element 650 may generate optical signals based on the received encrypted network traffic from the modular encryption card 620. The optical signals may then be communicated to a remote device via fiber optic port 618. Also, optical element 650 may be configured to receive optical signals via optical port 618 and convert the optical signals into electrical signals that are forwarded on to modular encryption card 620.

In some embodiments, a modular encryption device, such as modular encryption device 600 may be used as a modular optical connection adapter. For example, in some embodiments slots, such as slot 646 may not include a modular encryption card. However, the ports associated with slot 646, for example ports 616 and 618 of set 614 may still include an optical element, such as optical element 650 and a fiber optic port, such as fiber optic port 618. Thus in some embodiments, a modular encryption device may be used to convert network traffic communicated as electrical signals into optical signals and vice versa with or without encrypting the network traffic. In some embodiments, a modular encryption device, such as modular encryption device 600 may include optical elements associated with a first port and a second port of a set of ports. For example, in some embodiments set 614 may further include an additional optical element 650 (not shown) associated with port 616 and configured to covert electrical signals into optical signals. In such embodiments, port 616 may be an optical port, such as a port configured to couple with a fiber optic cable and configured to send and receive optical signals.

Figure 7:
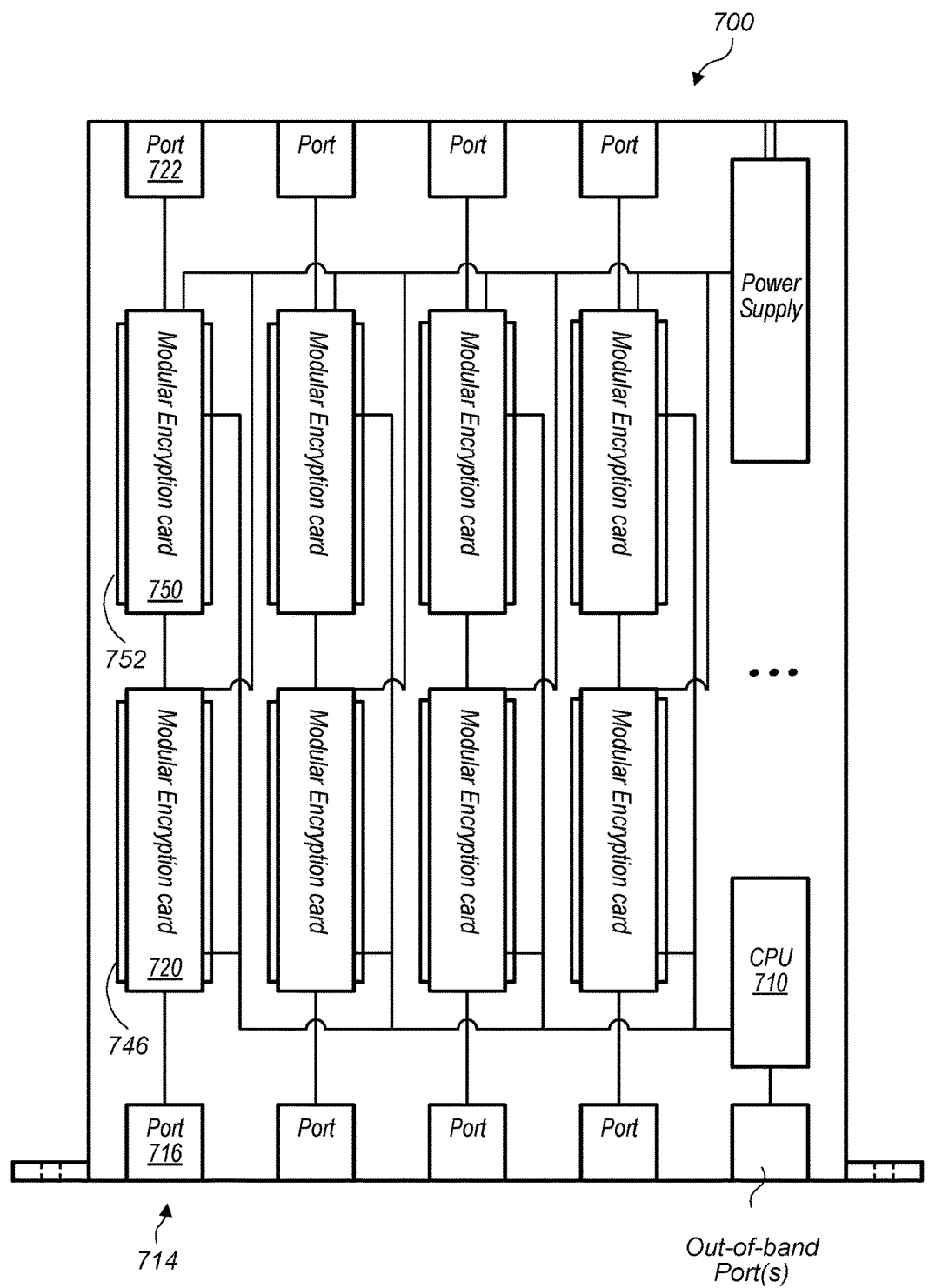
FIG. 7 is a block diagram illustrating components of a modular encryption device that includes multiple modular encryption cards for dual encryption from a top view, according to some embodiments.

In some embodiments, a modular encryption device may include modular encryption cards configured to provide dual layer encryption of network traffic. For example, FIG. 7 is a block diagram illustrating components of a modular encryption device that includes multiple modular encryption cards for dual encryption from a top view, according to some embodiments. Modular encryption device 700 includes similar components as modular encryption device 100 illustrated in FIG. 1. However, each set of ports in modular encryption device 700 has two associated modular encryption cards. For example, set 714 includes modular encryption card 720 and modular encryption card 750 mounted in slots 746 and 752. In a modular encryption device with dual layer encryption, network traffic may be received via a first port, such as port 716. The network traffic may then be encrypted via a first modular encryption card, such as modular encryption card 720. Encrypted network traffic from a first modular encryption card may be encrypted an additional time via a second modular encryption card, such as modular encryption card 750. The twice encrypted network traffic may then be forwarded to a remote device via another port of the set, such as port 718. In some embodiments some sets of ports may include dual slots configured to accept multiple modular encryption cards and other sets may include a single slot configured to accept a single modular encryption card. Any of the modular encryption devices described herein may include slots configured to accept multiple modular encryption cards per set of ports as described in FIG. 7.

In some embodiments, a processor of a modular encryption device with dual layer encryption, such as processor 710, may provide encryption keys to the modular encryption cards that are different from each other. For example, a first set of encryption keys may be used by modular encryption card 720 to perform a first layer encryption and a different set of encryption keys may be used by modular encryption card 750 to perform a second layer encryption. In some embodiments, a processor such as processor 710, may exchange encryption coordination information with multiple remote device to obtain and update encryption keys for dual layer encryption modular encryption cards. In some embodiments, a remote device may be another dual layer modular encryption device and respective processors of the two dual layer modular encryption devices may coordinate exchange of encryption keys for multi-layer modular encryption cards. In some embodiments, additional layers of encryption, for example more than two layers, may be applied by associating additional modular encryption cards with a set of ports. For example, set 114 may have three, four, or more modular encryption cards associated with set 114.

In some embodiments, a processor of a modular encryption device may be a modular CPU configured to be removed from the modular encryption device. Also, in some embodiments, a modular encryption device may be configured for modular CPUs to be removed and replaced in the modular encryption device.

Figure 8A:
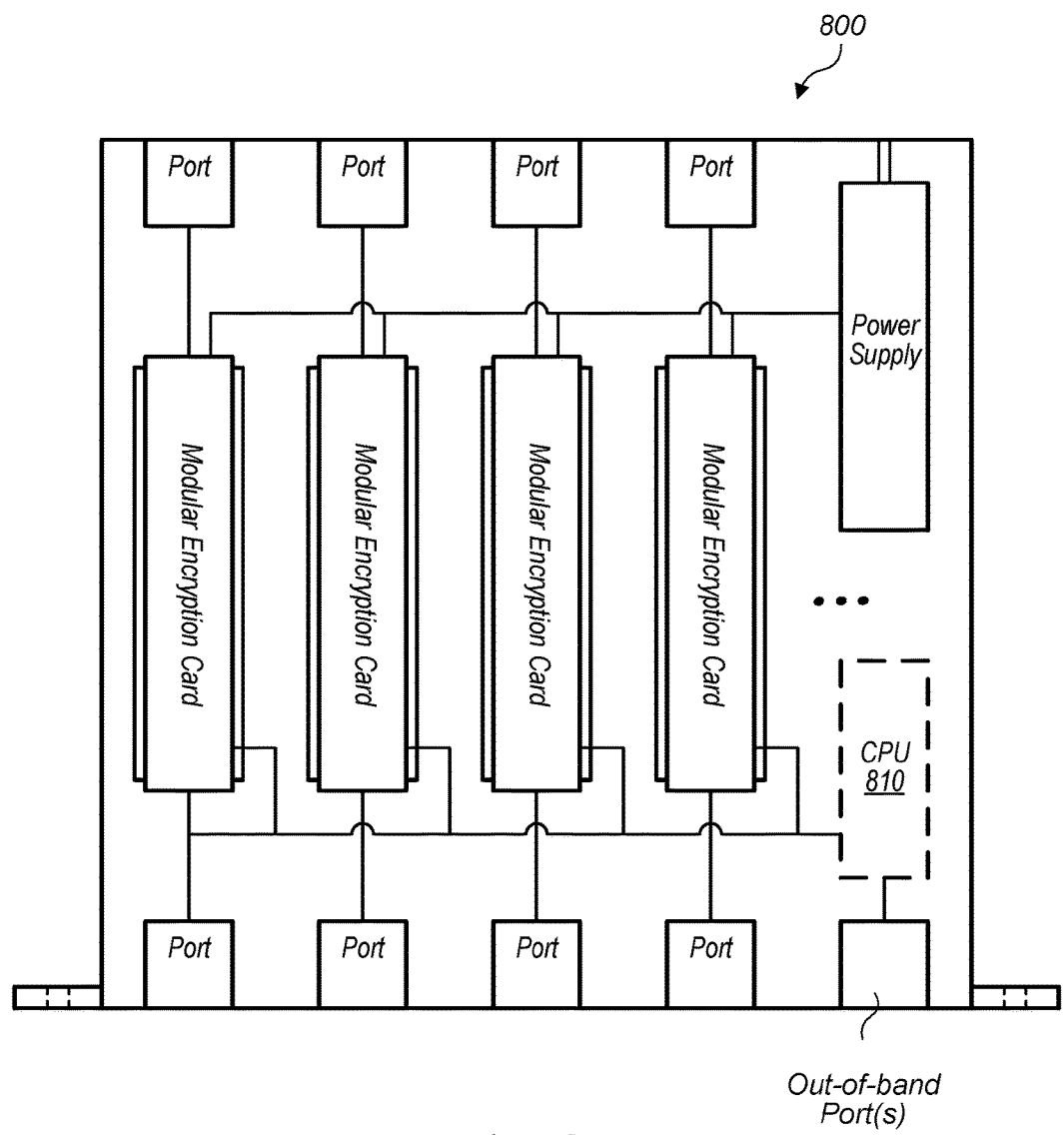
FIGS. 8A-B illustrate a central processing unit (CPU) of a modular encryption device being replaced, according to some embodiments.
Figure 8B:
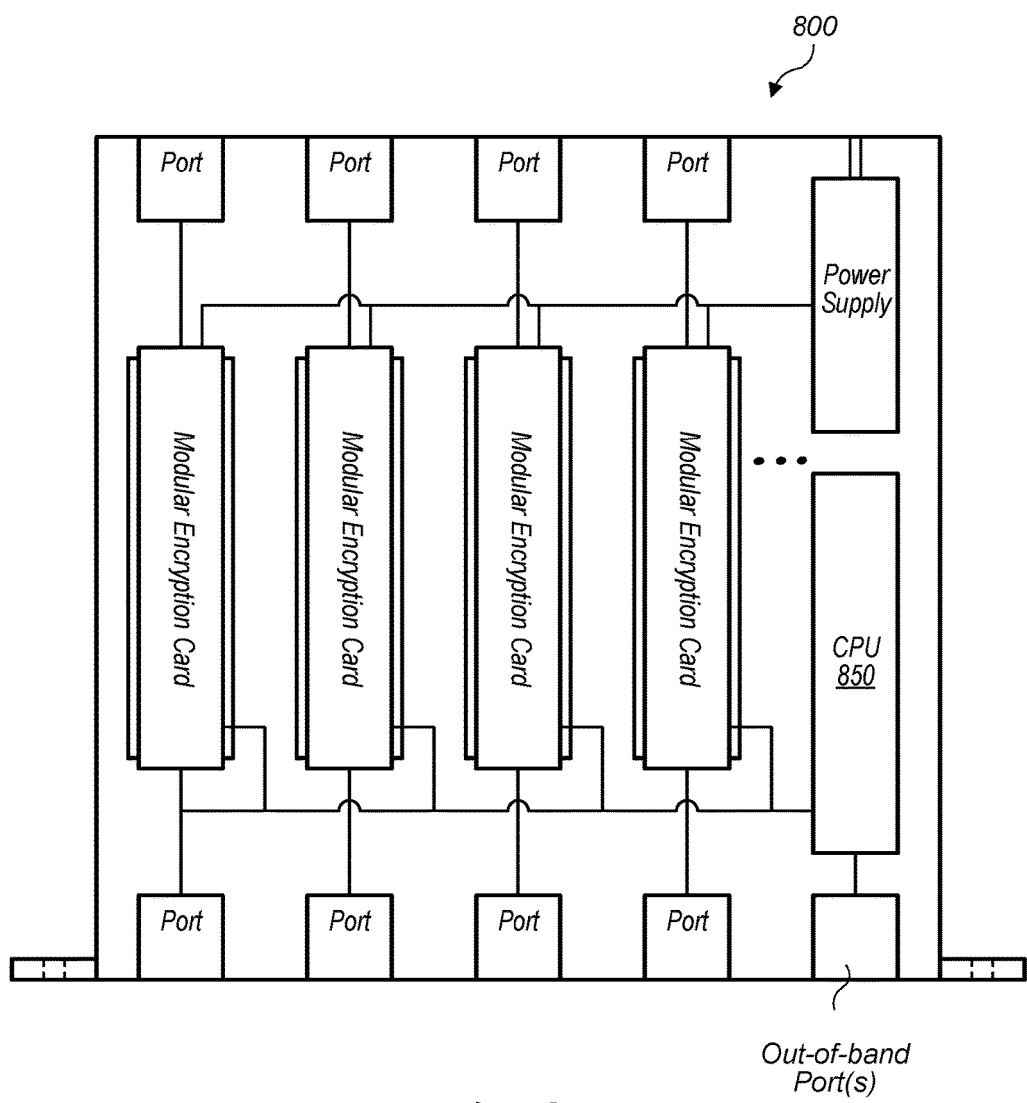

FIGS. 8A-B illustrate a modular CPU of an encryption device being replaced, according to some embodiments. Modular encryption device 800 may be a similar modular encryption device as modular encryption device 100 illustrated in FIG. 1B. However, any of the modular encryption devices described herein may be configured with replaceable CPUs as described in regard to FIGS. 8A-B.

Processor slot 810 may be configured to accept a processor such as processor 110 shown in FIG. 1. Processor slot 810 may be configured to accept a modular CPU or modular computing card and modular computing device 800 may be configured for a modular CPU to be removed and replaced. For example, FIG. 8A shows processor slot 810 with the processor removed and FIG. 8B shows a larger processor 850 installed in processor slot 810. For example, computing requirements of a modular computing device may increase over time and it may be desirable to replace an existing processor of a modular encryption device with a higher capacity processor.

Figure 9:
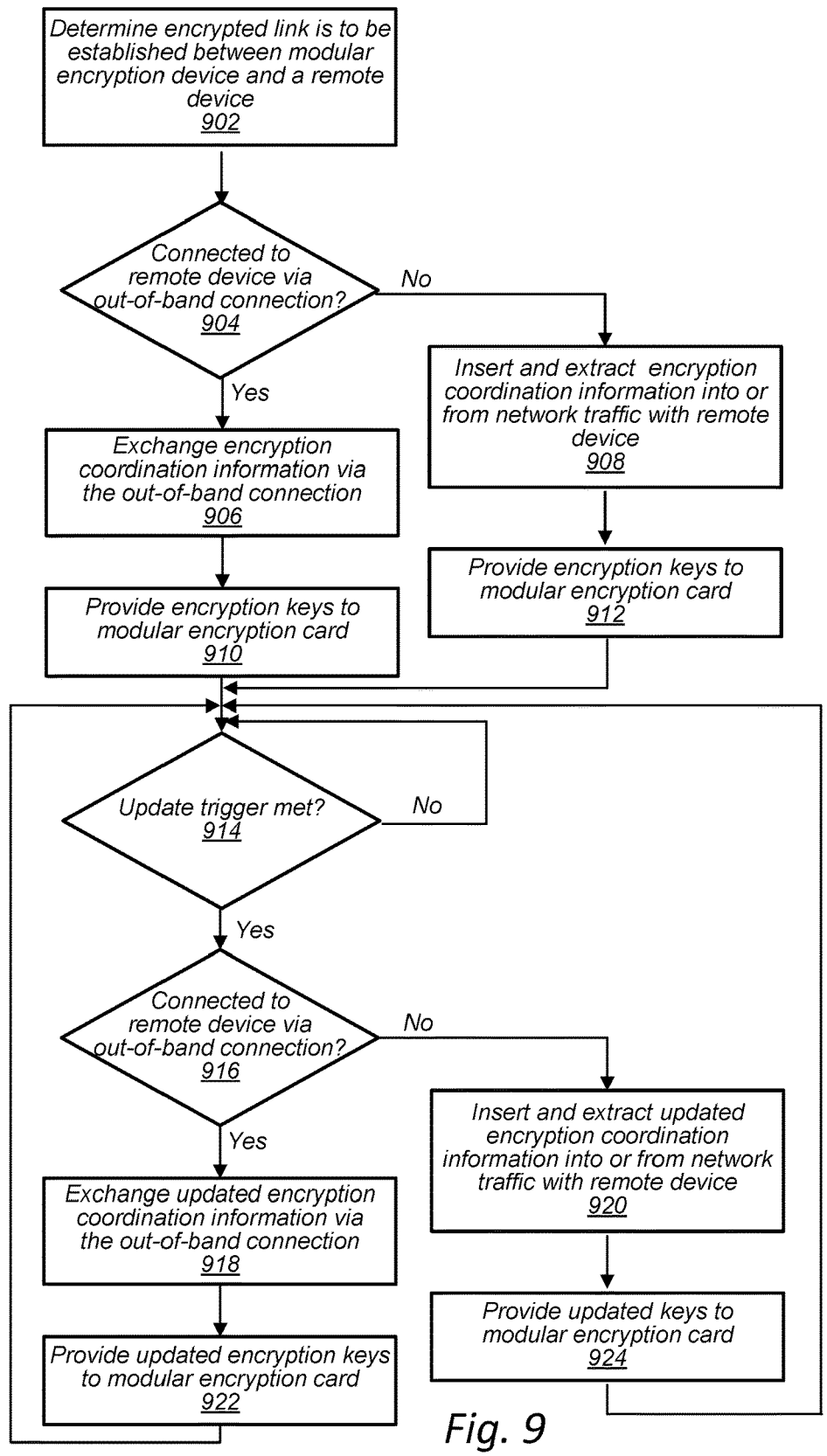
FIG. 9 is a flowchart illustrating one embodiment of exchanging encryption coordination information, as described herein.

FIG. 9 is a flowchart illustrating one embodiment of exchanging encryption coordination information, as described herein.

At 902 it is determined that an encrypted link is to be established between a modular encryption device and a remote device. In some embodiments, the remote device may be another modular encryption device, or may be another type of device such as a networking device, server, computing device, etc. In some embodiments, a modular encryption device may automatically establish an encrypted link when connected to a remote device. In some embodiments, a modular encryption device may establish an encrypted link in response to one or more commands. For example a management system connected to a modular encryption device may issue a command to the modular encryption device to establish an encrypted link. In some embodiments, a management system may be implemented on a server in a rack with the modular encryption device, may be implemented via a central system at a data center, may be implemented on a networking device that sends and receives network traffic via the modular encryption device, or may be implemented via other systems.

In order to exchange encryption coordination information, a processor of a modular encryption device may determine if an out-of-band connection is available to the remote device. In some embodiments, establishing a connection may include performing a handshake operation. In some embodiments a connection may be established in accordance with one or more encryption standards such as a Media Access Control Secure (MACSEC) standard, a secure socket layer (SSL) standard, or other encryption standard.

In embodiments in which an out-of-band connection is available, the processor of the modular encryption device may use the out-of-band connection to initially exchange encryption coordination information. In other embodiments, initially encryption coordination information may be exchanged via a port of a set of ports of the modular encryption device that will later be used as a port for an encrypted link. In some such embodiments, the encryption coordination information may later be updated via another port of a modular encryption device, for example a port that is used to establish an out-of-band connection. In some embodiments, an out-of-band port of a modular encryption device may be used to establish an out-of-band connection for initially exchanging encryption coordination information and may later be used to exchange updated encryption coordination information.

At 904 it is determined whether an out-of-band connection is available to the remote device.

At 906, in response to determining that an out-of-band connection to the remote device is available, the processor of the modular encryption device exchanges encryption coordination information, such as encryption keys, with the remote device via the out-of-band connection. At 910 the processor provides the encryption keys to one or more of the modular encryption cards for use in encrypting and decrypting network traffic flowing between the modular encryption device and the remote device.

At 908 in response to determining an out-of-band connection is not available to the remote device, the processor of the modular encryption device causes a corresponding modular encryption card to insert and extract encryption coordination information in network traffic flowing between the modular encryption device and the remote device. In some embodiments, the modular encryption card may then provide exchanged encryption coordination information to the processor for processing or may process the exchanged encryption coordination information itself. At 912 the processor makes encryption keys acquired as part of the encryption coordination information exchange at 908 available to the modular encryption card for use in encrypting and decrypting network traffic flowing between the modular encryption device and the remote device. Or, in embodiments in which the modular encryption card processes the exchanged encryption coordination information itself, the modular encryption card makes encryption keys obtained in the exchange available for use in encrypting and decrypting network traffic flowing between the modular encryption device and the remote device.

Once encryption coordination information is exchanged, such as encryption keys, the modular encryption device may receive network traffic that is to be encrypted from a networking device or computing device. In some embodiments, the networking device or computing device may be in a same location as the modular encryption device, for example in a same data center, or even mounted in a same rack as the modular encryption device. In some embodiments, the networking device or the computing device may be located in a location remote from the modular encryption device, but the data received from the remote device may be encrypted over an encrypted link to another remote device connected to the modular encryption device. Also, once encryption coordination information is exchanged, such as encryption keys, the modular encryption device may receive encrypted network traffic from the remote device that is to be decrypted.

Periodically encryption coordination information updates may be exchanged between the modular encryption device and the remote device. For example, encryption keys may be valid for a specified amount of time and new encryption keys may be exchanged at or before a current set of encryption keys expires.

At 914 it is determined if a trigger for an encryption coordination information update has been met. In some embodiments, a trigger for updating encryption coordination information, such as encryption keys, may be an amount of time that has elapsed since encryption coordination information was last exchanged. For example, after a threshold amount of time has elapsed since a last time encryption keys were exchanged for an encrypted link an update may be triggered to update the encryption keys. In some embodiments, a trigger for updating encryption coordination information may be an amount of data exchanged via the encrypted link. For example, in some embodiments, when an amount of data exchanged via an encrypted link exceeds a threshold amount of data, encryption coordination information may be exchanged to update the encryption coordination information, such as updating encryption keys. If it is determined at 914 that an update trigger has not been met, the process continues to monitor the update trigger criteria to determine when an update trigger is met.

At 916 it is determined whether an out-of-band connection is available to the remote device in a similar manner as at 904.

At 918, in response to determining that an out-of-band connection to the remote device is available, the processor of the modular encryption device exchanges updated encryption coordination information, such as updated encryption keys, with the remote device via the out-of-band connection. At 922 the processor provides the updated encryption keys to one or more of the modular encryption cards for use in encrypting and decrypting network traffic flowing between the modular encryption device and the remote device. The process then reverts to 914 and repeats when an update trigger is met.

At 920 in response to determining an out-of-band connection is not available to the remote device, the processor of the modular encryption device causes a corresponding modular encryption card to insert and extract encryption coordination information in network traffic flowing between the modular encryption device and the remote device. In some embodiments, the modular encryption card may then provide exchanged encryption coordination information with the processor for processing or may process the exchanged encryption coordination information itself. At 924 the processor makes encryption keys acquired as part of the encryption coordination information exchange at 920 available to the modular encryption card for use in encrypting and decrypting network traffic flowing between the modular encryption device and the remote device. Or, in embodiments in which the modular encryption card processes the exchanged encryption coordination information itself, the modular encryption card makes encryption keys obtained in the exchange available for use in encrypting and decrypting network traffic flowing between the modular encryption device and the remote device. The process then reverts to 914 and repeats when an update trigger is met.

Figure 10A:
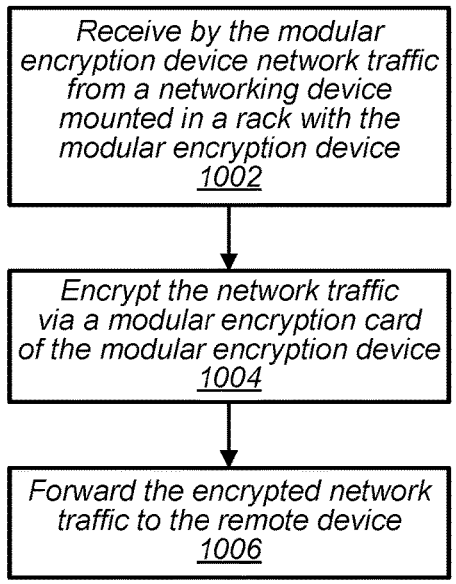
FIG. 10A is a flowchart illustrating one embodiment of a method for encryption, as described herein.

FIG. 10A is a flowchart illustrating one embodiment of a method for encryption, as described herein.

Once encryption coordination information is exchanged, such as encryption keys, a modular encryption device may receive network traffic that is to be encrypted from a networking device or computing device. In some embodiments, the networking device or computing device may be in a same location as the modular encryption device, for example in a same data center, or even mounted in a same rack as the modular encryption device. In some embodiments, the networking device or the computing device may be located in a location remote from the modular encryption device. However the data received from the remote device may be encrypted over an encrypted link to another remote device connected to the modular encryption device.

At 1002 a modular encryption device receives network traffic from a networking device mounted in the rack with modular encryption device. Though, as described above, in some embodiments the network traffic may be received from another type of device or from a device mounted in a different location.

At 1004 network traffic received by the modular encryption device may be encrypted by a modular encryption card of the modular encryption device. For example, the modular encryption card may be in a data path between a set of ports of the modular encryption device and may encrypt the network traffic as the network traffic flows between the ports of the set via a modular encryption card of the modular encryption device. In some embodiments, a modular encryption device may include multiple layers of modular encryption cards associated with a set of ports and the received network traffic may be encrypted with two or more layers of encryption.

At 1006, the encrypted network traffic may be forwarded on to the remote device via an encrypted link between the modular encryption device and the remote device.

Figure 10B:
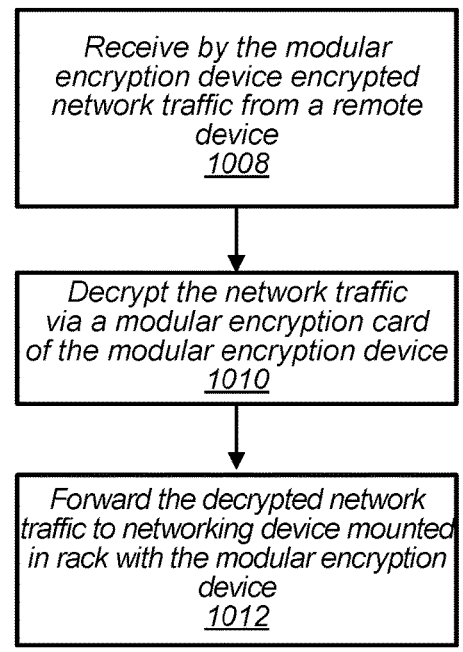
FIG. 10B is a flowchart illustrating one embodiment of a method for decryption, as described herein.

FIG. 10B is a flowchart illustrating one embodiment of a method for decryption, as described herein.

At 1008 the modular encryption device receives encrypted network traffic from a remote device. At 1010, a modular encryption card of the modular encryption device decrypts the encrypted network traffic from the remote device using one or more encryption keys exchanged with the remote device.

At 1012, the modular encryption device forwards the decrypted network traffic to a networking device at the location where the modular encryption device is located. In some embodiments the networking device may be located in a same data center or a same rack as the modular encryption device. In other embodiments the networking device may be remotely located from the modular encryption device.

Note that in some embodiments encryption as described in FIG. 10A and decryption as described in FIG. 10B may be performed simultaneously by a modular encryption card or may be performed sequentially. Also, in some embodiments, exchanged encryption coordination information may include encryption keys for both encrypting and decrypting network traffic. In some embodiments, providing encryption keys to a remote device and receiving encryption keys from a remote device may be performed as sequential steps or may be performed at the same time.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
 a networking device mounted in a rack; and
 a modular encryption device mounted in the rack, wherein the modular encryption device comprises:
  a chassis coupled with the rack;
  sets of communication ports coupled to the chassis, wherein each set comprises a first port and a second port, wherein the first ports of each of the sets are connected to the networking device and the second ports of each of the sets are connected to one or more remote devices;
  slots located in the chassis between the first and second ports of each of the sets;
  an out-of-band port coupled to the chassis;
  a processor configured to exchange encryption coordination information via the out-of-band port; and
  modular encryption cards mounted in the slots such that network traffic passing between a first port and a second port of a respective one of the sets of communication ports flows through a respective one of the modular encryption cards, wherein the modular encryption cards are configured to apply the exchanged encryption coordination information to encrypt and decrypt network traffic as the network traffic flows through the modular encryption cards,
  wherein the slots and the sets of communication ports are configured such that respective ones of the modular encryption cards are removable from respective ones of the slots while the communication ports and other ones of the modular encryption cards remain in the chassis.

2. The system of claim 1, further comprising:
 a remote modular encryption device, wherein the second ports of each of the sets of the modular encryption device are connected to the one or more remote devices via the remote modular encryption device,
 wherein the remote modular encryption device comprises:
  an out-of-band port; and
  a processor configured to exchange encryption coordination information via an out-of-band connection between the respective out-of-band ports of the modular encryption device and the remote modular encryption device.

3. The system of claim 2, further comprising:
 an additional modular encryption device mounted in the rack; and
 an additional remote modular encryption device;
 wherein the additional modular encryption device and the additional remote modular encryption device are connected between the modular encryption device and the remote modular encryption device such that the additional modular encryption device and the additional remote modular encryption device apply a second encryption layer to encrypted network traffic flowing between the modular encryption device and the remote modular encryption device.

4. The system of claim 1, wherein the rack in which the networking device is mounted is a standard rack, and wherein the modular encryption device is configured to mount in a slot of the standard rack.

5. The system of claim 1, wherein the modular encryption cards each comprise a media access control secure (MACSEC) physical layer transceiver (PHY) or a field programmable gate array (FPGA) configured to encrypt and decrypt data according to an encryption standard.

6. A modular encryption device comprising:
 a chassis;
 a set of communication ports coupled with the chassis, wherein the set comprises a first port and a second port;
 a slot located in the chassis between the first and the second port;
 an out-of-band port coupled to the chassis;
 a processor configured to exchange encryption coordination information via the out-of-band port; and a modular encryption card mounted in the slot such that network traffic passing between the first port and the second port flows through the modular encryption card, wherein the modular encryption card is configured to apply the exchanged encryption coordination information to encrypt and decrypt network traffic as the network traffic flows through the modular encryption card, and wherein the slot and the set of communication ports are configured such that the modular encryption card is removable from the slot while the slot and the communication ports remain in the chassis.

7. The modular encryption device of claim 6, further comprising:

an additional set of ports;

an additional slot located between a first port and a second port of the additional set of ports; and an additional modular encryption card mounted in the additional slot, wherein the processor is configured to exchange encryption coordination information via the out-of-band port for an encrypted connection via the modular encryption card and an additional encrypted connection via the additional modular encryption card.

8. The modular encryption device of claim 6, wherein the processor is further configured to insert and extract encryption coordination information into network traffic that flows between the modular encryption device and the remote encryption device.

9. The modular encryption device of claim 6, wherein the modular encryption card comprise a media access control secure (MACSEC) physical layer transceiver (PHY) or a field programmable gate array (FPGA) configured to encrypt and decrypt data according to an encryption standard.

10. The modular encryption device of claim 6, further comprising:

additional sets of ports;

additional slots located between respective first and second ports of the additional sets of ports; and additional modular encryption cards mounted in additional ones of the additional slots, wherein each of the additional modular encryption cards and the modular encryption card are mounted in separate ones of the slots and are configured to implement separate encrypted links with one or more remote devices.

11. The modular encryption device of claim 10, wherein the slot and the additional slots are configured for the modular encryption card or one of the additional module encryption cards to be removed from the modular encryption device and replaced with another modular encryption card.

12. The modular encryption device of claim 6, wherein the processor is a modular central processing unit (CPU), the module encryption device further comprising:

a processor slot configured to accept the modular CPU, wherein the processor slot is configured for the modular CPU to be removed from the modular encryption device and replaced with another CPU.

13. The modular encryption device of claim 6, further comprising:

optical elements mounted between the first and second ports, wherein the optical elements are configured to receive and transmit optical communications.

14. The modular encryption device of claim 6, further comprising:

an additional slot between one the first port and the second port of the set of ports; and an additional modular encryption card mounted in the additional slot such that network traffic passing between the first port and the second port flows through the modular encryption card and the additional modular encryption card, wherein the additional modular encryption card is configured to apply or remove a second encryption layer to encrypted network traffic.

15. A method comprising:

exchanging encryption coordination information between a modular encryption device mounted in a first slot in a rack and a remote encryption device via an out-of-band port of the modular encryption device;

receiving, by the modular encryption device mounted in the first slot in the rack, network traffic from a networking device mounted in another slot in the rack, wherein the modular encryption device comprises a chassis separate from a chassis of the networking device;

encrypting, via a modular encryption card of the modular encryption device, the received network traffic, wherein said encrypting is performed based, at least in part, on the exchanged encryption coordination information;

further encrypting the encrypted network traffic via another modular encryption card of the modular encryption device or another module encryption card of another modular encryption device mounted in another slot in the rack, wherein said further encrypting is performed based, at least in part, on the exchanged encryption coordination information; and forwarding the further encrypted network traffic to a remote device connected to the modular encryption device or the other modular encryption device.

16. The method of claim 15, further comprising:

receiving, by the modular encryption device or the other modular encryption device, encrypted network traffic;

decrypting, via the other modular encryption card, a second layer of encryption of the encrypted network traffic, wherein said decrypting the second layer of encryption is performed based, at least in part, on the exchanged encryption coordination information;

decrypting, via the modular encryption card, a first layer of encryption of the encrypted network traffic, wherein said decrypting the first layer of encryption is performed based, at least in part, on the exchanged encryption coordination information; and forwarding the decrypted network traffic to the network device mounted in the rack with the modular encryption device.

17. The method of claim 16, further comprising:

causing, by a processor of the modular encryption device or the other modular encryption device, the encryption coordination information to be provided to the modular encryption card and the other modular encryption card to encrypt and decrypt the network traffic.

18. The method of claim 17, further comprising:

inserting an encryption key in the network traffic forwarded to the remote device; or extracting an encryption key from the network traffic received from the remote device.

* * * * *